United States Patent
Wu

(10) Patent No.: US 12,002,494 B2
(45) Date of Patent: Jun. 4, 2024

(54) METHOD AND DEVICE FOR DETECTING HARD DISK CONNECTION AND DISCONNECTION DURING A COMPUTER SESSION

(71) Applicant: Fulian Precision Electronics (Tianjin) Co., LTD., Tianjin (CN)

(72) Inventor: Hong-Shuang Wu, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 371 days.

(21) Appl. No.: 17/534,713

(22) Filed: Nov. 24, 2021

(65) Prior Publication Data
US 2023/0050294 A1 Feb. 16, 2023

(30) Foreign Application Priority Data
Aug. 6, 2021 (CN) .......................... 202110902398.8

(51) Int. Cl.
G11B 33/12 (2006.01)
G06F 13/40 (2006.01)
G11B 33/02 (2006.01)

(52) U.S. Cl.
CPC ........ *G11B 33/128* (2013.01); *G06F 13/4081* (2013.01); *G11B 33/027* (2013.01); *G11B 2220/2516* (2013.01)

(58) Field of Classification Search
CPC . G06F 13/4081; G11B 33/128; G11B 33/027; G11B 2220/2516
See application file for complete search history.

(56) References Cited

U.S. PATENT DOCUMENTS

| | | | | |
|---|---|---|---|---|
| 6,875,830 B2* | 4/2005 | Schuchardt | ............. | C08F 10/00 526/348 |
| 7,676,624 B2* | 3/2010 | Chu | ...................... | G06F 1/1632 709/227 |
| 7,782,563 B2* | 8/2010 | Han | ........................ | G11B 21/12 360/75 |
| 8,671,153 B1* | 3/2014 | Chu | .................... | G06F 13/4022 710/305 |
| 9,047,907 B2* | 6/2015 | Nguyen | ............... | G11B 19/043 |
| 2019/0114100 A1* | 4/2019 | Yang | .................... | G06F 13/4282 |
| 2023/0221387 A1* | 7/2023 | Chi | ..................... | G06F 11/2221 714/42 |

FOREIGN PATENT DOCUMENTS

CN 111930576 A 11/2020

* cited by examiner

*Primary Examiner* — Henry Tsai
*Assistant Examiner* — Christopher A Daley
(74) *Attorney, Agent, or Firm* — ScienBiziP, P.C.

(57) ABSTRACT

A device to detect hot-plugging and hot-unplugging of hard disk and the hard disk type includes a connector and a control circuit. When hot-plugged, the hard disk is coupled to the connector, the control circuit comprises delay circuit and latch circuit. The delay circuit delays a falling edge of the third signal and outputs a delay signal, the latch circuit processes the first and second signals and outputs a logical result as a latch signal. The control circuit determines the connected or disconnected status and type of the hard disk according to the respective levels of the first and second signals, the delay signal, and the latch signal. The delay signal and the latch signal work to correct error of the control circuit in determining connectivity and non-connectivity during a session due to asynchronous changes in signal levels of the first and second signals.

17 Claims, 6 Drawing Sheets

METHOD AND DEVICE FOR DETECTING HARD DISK CONNECTION AND DISCONNECTION DURING A COMPUTER SESSION

TECHNICAL FIELD

The present disclosure relates to computer control, in particular to method and device for detecting hard disk.

BACKGROUND

The hybrid hard disk driver backplane (Hybrid HDDBP) technology is widely used in servers. The hybrid HDDBP supports hard disks using serially attached small computer system interface (SAS) and serial advanced technology attachment (SATA) interfaces, and also supports the use of non-volatile memory host controlled hard disk with interface specification protocol.

The complex programming logic device (CPLD) on the backplane of the composite hard disk drive can determine whether a hard disk is inserted in the backplane of the composite hard disk drive and the type of the hard disk according to the IFDET signal and the PRSNT signal. The method can detect the level of the IFDET signal and the PRSNT signal, if both are high-level signals, no hard disk is in place, if both are low-level signals, the SAS/SATA hard disk is in place. If the IFDET signal is a low-level signal and the PRSNT signal is a high-level signal, an NVME hard disk is in place. When the hard disk is hot-plugged, the changes in levels of the IFDET signal and the PRSNT signal are not synchronized, causing mis-determination by the CPLD as to the status of the hard disk and the type of the hard disk.

Therefore, improvement is desired.

DETAILED DESCRIPTION

The technical solutions in the embodiments of the present disclosure will be described clearly and completely in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

Figure 1:
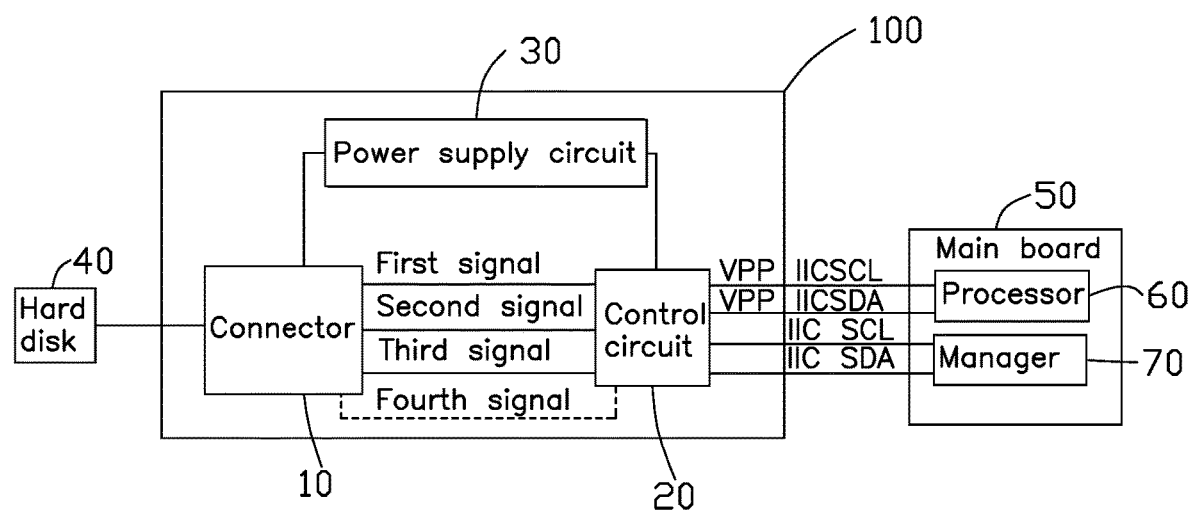
FIG. 1 is a schematic diagram of a hard disk detecting device according to an embodiment of the present disclosure.

FIG. 1 is a schematic diagram of the hard disk detecting device 100 of the present disclosure.

The hard disk detecting device 100 is used to detect the presence of a hard disk which is hot-plugged into a computer device or system ("position status") and the type of such hard disk in the electronic device (not shown). The electronic device may be a server. The hard disk detecting device 100 includes a connector 10, a control circuit 20, and a power supply circuit 30. The connector 10 is electrically connected to the hard disk 40 and the control circuit 20, and the control circuit 20 is electrically connected to a main board 50. In one embodiment, the main board 50 may include a processor 60 and a manager 70, and the power supply circuit 30 is electrically connected to the connector 10 and the control circuit 20 for supplying power to the connector 10 and the control circuit 20.

The connector 10 is used for outputting a first signal, a second signal, and a third signal to the control circuit 20 according to the position status and hard disk type of the hard disk 40. The hard disk 40 can be a serially attached small computer system interface (SAS) hard disk, a serial advanced technology attachment (SATA) hard disk, or a nonvolatile memory express (NVME) interface specification hard disk.

In one embodiment, the position status indicates when the hard disk 40 has been hot inserted into the connector 10, and the first signal, the second signal and the third signal are used to instruct the control circuit 20 to determine the position status and type of the hard disk 40. Before the hard disk 40 is inserted into the connector 10, the first signal, the second signal, and the third signal are all high-level signals. When the SAS hard disk or the SATA hard disk is hot inserted, the first signal, the second signal, and the third signal are low-level signals. When an NVME hard disk is hot inserted, the first signal, the second signal, and the third signal are low-level, high-level, and low-level signals respectively.

The control circuit 20 is electrically connected to the processor 60 and the manager 70 of the main board 50. In one embodiment, the processor 60 may be a central processing unit (CPU) for processing server information and running relevant computer programs. The manager 70 is a baseboard management controller (BMC) for monitoring the status of the server and controlling the operation of the server. The control circuit 20 is used to determine the position status and type of the hard disk 40 according to the first signal, the second signal, and the third signal, output the first position signal to the processor 60 of the main board 50, and output the second position signal to the manager 70 of the main board 50. The first position signal represents the position status of the NVME hard disk, and the second position signal represents the position status in respect of the SAS hard disk or the SATA hard disk.

In one embodiment, the control circuit 20 can establish a communication connection with the processor 60 and the manager 70 through an inter-integrated circuit (I2C) bus. The I2C bus includes a serial clock (SCL) bus for providing a clock signal when transmitting a signal, and a serial data (SDA) bus for transmitting data.

In the embodiment, the processor 60 may output a first control signal to the control circuit 20 according to the first position signal. The first control signal includes a virtual pin port (VPP) address. The VPP address is the address assigned to the NVME hard disk interface by the hybrid hard disk drive backplane (HDDBP), which is used to indicate the fact of connection of the NVME hard disk on the composite hard disk drive backplane. When the control circuit 20 receives the first control signal, the control circuit 20 may perform related operations according to the first control signal. For example, the control circuit 20 can light an indicator of the NVME hard disk according to the VPP address, which is located on the composite hard disk drive backplane.

In the embodiment, the manager 70 can display the connected status and type of SAS/SATA hard disk and NVME hard disk through the manager web page according to the second position signal. The manager web page provides information visually and can display the data content in the manager 70 through an external display for users to query and control the status of the server.

Figure 2:
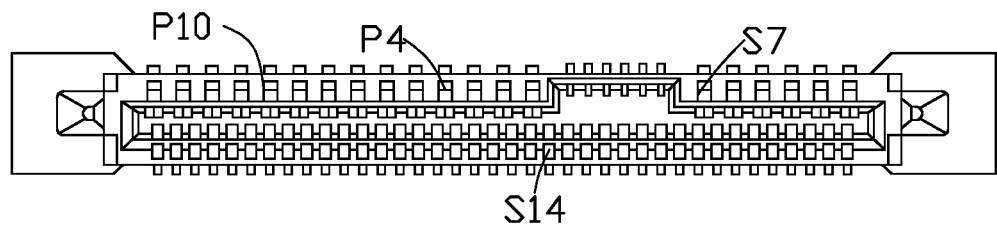
FIG. 2 is a schematic diagram of a connector according to an embodiment of the present disclosure.

FIG. 2 is a schematic diagram of the connector 10 of the present disclosure.

In one embodiment, the interface type of connector 10 can be U.2 interface. The connector 10 includes at least one integrated circuit chip and pins P4, P10, S7, and S14 on the chip. The pins P4, P10, S7, and S14 are electrically connected to the control circuit 20 and the hard disk 40. In the embodiment, before any hard disk 40 is inserted in the connector 10, the pins P4, P10, S7, and S14 are electrically connected to the DC power supply (not shown) through a pull-up resistance (not shown). Therefore, the first signal, the second signal, the third signal, and the fourth signal outputted by the pins P4, P10, S7, and S14 are all high-level signals.

When the SAS hard disk or the SATA hard disk is inserted during a session, since the positions corresponding to pins P4, P10, and S7 on the SAS hard disk or the SATA hard disk have a short path to ground, the levels at the pins P4, P10, and S7 are no longer determined by the DC power supply. The grounded state is low-level, thus the first signal, the second signal and the third signal are all low-level signals.

The position corresponding to the pin S14 on the SAS hard disk has a short path of grounding. At this time, the fourth signal is a low-level signal, while the position corresponding to the pin S14 on the SATA hard disk does not have a short path of grounding. At this time, the fourth signal is a high-level signal. When the NVME hard disk is inserted, because the positions corresponding to the pins P4, S7, and S14 on the NVME hard disk have a short path to ground, the levels at the pins P4, S7, and S14 are no longer determined by the DC power supply, but are low-level in the grounded state. The first signal, the third signal, and the fourth signal are low-level signals, and the second signal is still a high-level signal.

Figure 3A:
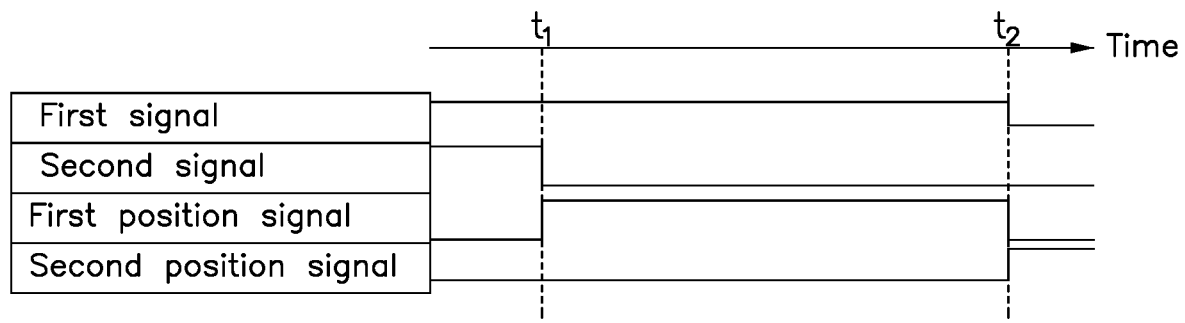
FIGS. 3A and 3B are schematic diagrams of signal timing during hard disk hot insertion according to an embodiment of the present disclosure.

FIG. 3A shows the signal timing diagram when the hard disk is hot inserted.

At time T1, the first signal changes from a high-level signal to a low-level signal. It can be understood that at this time, the SAS hard disk or the SATA hard disk is hot inserted, but the changes in level of the first signal and the second signal are not synchronized. At this time, the change in level of the first signal is earlier than the change in level of the second signal, and the second signal is still a high-level signal. If the control circuit 20 determines the position state and type of the hard disk according to the levels of the first and second signals only, the first position signal should be a high-level signal at this time, indicating that the NVME hard disk is connected, which leads to the mis-determination of the NVME hard disk by the control circuit 20 at time T1-T2.

Figure 3B:
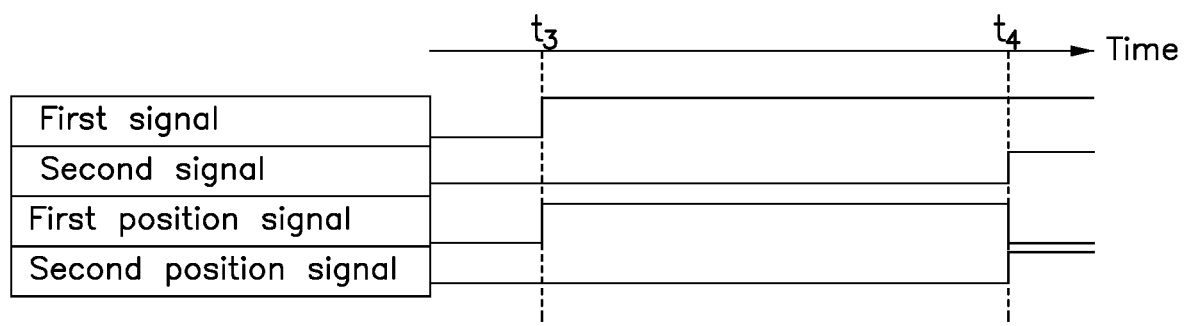

FIG. 3B shows the signal timing diagram when the hard disk is removed during the session.

At time T3, the second signal changes from a low-level signal to a high-level signal. When the SAS hard disk or the SATA hard disk is hot unplugged, the change in level of the second signal is earlier than the change in level of the first signal, and the first signal is still a low-level signal, because the level changes of the first signal and the second signal are not synchronized. If the control circuit 20 determines the position status and type of the hard disk only according to the level state of the first and second signals, the first position signal should be a high-level signal at this time, indicating that the NVME hard disk is in position, leading to mis-determination of the NVME hard disk by the control circuit 20 at time T3-T4.

Figure 4:
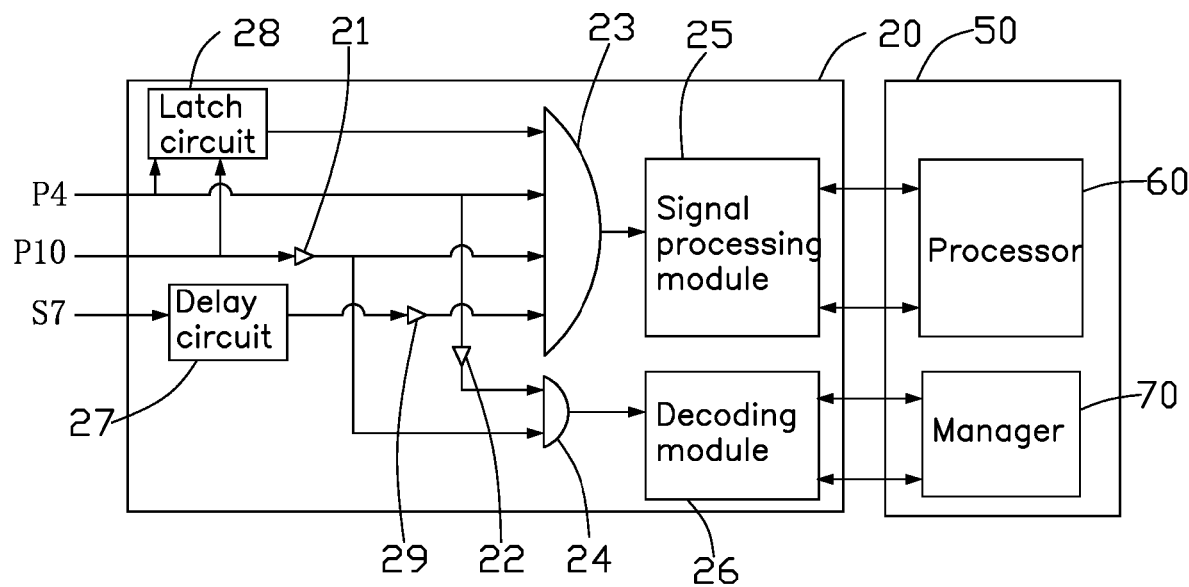
FIG. 4 is a circuit diagram of a control circuit according to an embodiment of the present disclosure.

FIG. 4 is a schematic diagram of the control circuit 20 of the present disclosure.

In the embodiment, the control circuit 20 is a complex programming logic device (CPLD). The control circuit 20 includes a non-logic gate 21, a non-logic gate 22, a non-logic gate 29, a logic gate 23, and a logic gate 24, a signal processing module 25, a decoding module 26, a delay circuit 27, and a latch circuit 28.

An input terminal of the non-logic gate 21 is electrically connected to the pin P10 of the connector 10 for receiving the first signal, and an output terminal of the non-logic gate 21 is electrically connected to a first input terminal of the logic gate 23 and a first input terminal of the logic gate 24.

An input terminal of the non-logic gate 22 is electrically connected to the pin P4 of the connector 10 for receiving the second signal, and an output terminal of the non-logic gate 22 is electrically connected to a second input terminal of the logic gate 24.

An input terminal of the non-logic gate 29 is electrically connected to an output terminal of the delay circuit 27, and an output terminal of the non-logic gate 29 is electrically connected to the second input terminal of the logic gate 23.

The first input terminal of the logic gate 23 is electrically connected to the output terminal of the non-logic gate 21, and the second input terminal of the logic gate 23 is electrically connected to the output terminal of the non-logic gate 29. The third input terminal of the logic gate 23 receives the second signal, and a fourth input terminal of the logic gate 23 is electrically connected to an output terminal of the latch circuit 28. The output terminal of the logic gate 23 is electrically connected to the signal processing module 25.

The first input terminal of the logic gate 24 is electrically connected to the output terminal of the non-logic gate 21, the second input terminal of the logic gate 24 is electrically connected to the output terminal of the non logic gate 22, and the output terminal of the logic gate 24 is electrically connected to the decoding module 26.

The signal processing module 25 is electrically connected to the output terminal of the logic gate 23 and the processor 60 for receiving the first position signal outputted by the logic gate 23 and the first control signal outputted by the processor 60. Upon receiving it, the signal processing module 25 transmits the first position signal to the processor 60, and performs relevant operations according to the received first control signal. For example, the signal processing module 25 can light the indicator of the NVME hard disk according to the VPP address.

The decoding module 26, electrically connected to the output terminal of the logic gate 24 and the manager 70, transmits the second position signal output received from the logic gate 24 and transmits it to the manager 70.

The delay circuit 27 is electrically connected to the input terminal of the non-logic gate 29 and the pin S7 of the connector 10. The delay circuit 27 is used to receive the third signal output by the pin S7 and to delay the falling edge of the third signal for 100 ms, and output the delay signal to the input terminal of the non-logic gate 29.

The latch circuit 28 is electrically connected to the fourth input terminal of the logic gate 23 and the pins P4 and P10 of the connector 10. The latch circuit 28 receives the first signal outputted by the pin P4 and the second signal outputted by the pin P10, processes the first and second signals and outputs the latch signal as the result to the fourth input terminal of the logic gate 23.

The inputs and logical outputs of the latch signal are shown in Table 1.

TABLE 1

| First signal | Second signal | Latch signal |
|---|---|---|
| 0 | 0 | 0 |
| 1 | 1 | 1 |
| 0 | 1 | Maintain |
| 1 | 0 | Maintain |

As shown in Table 1, when both the first signal and the second signal are low-level signals, the latch signal is a low-level signal, and when both the first signal and the second signal are high-level signals, the latch signal is a high-level signal. When the levels of the first and second signals are different, the latch signal maintains the level it had previously. Therefore, the first signal and the second signal can be latched by the latch circuit 28 to output the latch signal. When the SAS hard disk or the SATA hard disk unplugged during a session, the second signal is a high-level signal, and the first signal may still be a low-level signal. At this time, the latch signal maintains the level at the state it was in before the SAS hard disk or the SATA hard disk is hot unplugged, and the latch signal is a low-level signal.

In the embodiment, to avoid the effect of an asynchronous change in levels of the first signal and the second signal, the control circuit 20 also needs to determine the bit state of the NVME hard disk according to the levels of other signals. The third signal outputted from the pin S7 of the connector 10 can also represent the hard disk in position state. After experimentation, the levels of the third and second signals basically change at the same time, or within 50 ms of each other, the change in level of the third signal happening earlier than that of the second signal. Therefore, the delay of 100 ms of the falling edge of the third signal is significant and is taken as the delay signal through the delay circuit 27. When the SAS hard disk or the SATA hard disk is hot inserted, the first signal is a low-level signal, the second signal may still be a high-level signal, and the third signal is also a high-level signal. The control circuit 20 can correctly determine that the NVME hard disk is disconnected according to the high-level signal of the delay signal.

In the embodiment, the control circuit 20 also correctly determines that the NVME hard disk is disconnected according to the low-level signal of the latch signal.

In one embodiment, the control circuit 20 also determines the position status and type of the SAS hard disk or the SATA hard disk according to the levels of the first signal, the second signal, and the fourth signal.

When the SAS hard disk or the SATA hard disk is hot plugged in, two stages take place.

The first stage: the pin P4 of connector 10 outputs the first signal at low-level to the latch circuit 28, and the first signal passes through the non-logic gate 21. The non-logic gate 21 outputs a high-level signal to the first input terminal of the logic gate 23 and the first input terminal of the logic gate 24. Since the changes in level of the first signal and the second signal are not synchronized, the pin P10 of the connector 10 still outputs the second signal at high-level to the latch circuit 28, the third input terminal of the logic gate 23, and the second input terminal of the logic gate 24. The latch circuit 28 outputs a high-level signal to the fourth input terminal of the logic gate 23, and the pin S7 of the connector 10 outputs the third signal at high-level to the non-logic gate 29 through the delay circuit 27. The non-logic gate 29 outputs a low-level signal to the second input terminal of the logic gate 23. At this time, since the second input terminal of the logic gate 23 is a low-level signal, the first position signal at low-level is output with the logic gate 23, indicating that the NVME hard disk is not connected.

The second stage: the second signal becomes a low-level signal. Since the third input terminal of the logic gate 23 is a low-level signal, the first position signal of the low-level signal is output with the logic gate 23, indicating that the NVME hard disk is not connected. On the other hand, the input signals of the first input terminal and the second input terminal of the logic gate 24 are high-level signals, and the logic gate 24 outputs high-level signals, indicating that the SAS/SATA hard disk is connected.

When the SAS hard disk or the SATA hard disk is unplugged during a session, there are two stages which occur.

First stage: the pin P10 of the connector 10 outputs the second signal at high-level to the latch circuit 28, the third input terminal of the logic gate 23, and the second input terminal of the logic gate 24. Since the changes in level of the first signal and the second signal are not synchronized, the pin P4 of the connector 10 still outputs the first signal at low-level to the latch circuit 28, and the latch circuit 28 outputs the low-level signal to the fourth input terminal of the logic gate 23. The first signal passes through the non-logic gate 21, which outputs a high-level signal to the first input terminal of the logic gate 23 and the first input terminal of the logic gate 24. The pin S7 of the connector 10 outputs the third signal at low-level, and outputs the delay signal to the non-logic gate 29 through the delay circuit 27, and the non-logic gate 29 outputs the high-level signal to the second input terminal of the logic gate 23. Since the fourth input terminal of the logic gate 23 is a low-level signal, and the logic gate 23 outputs the first position signal at low-level, the NVME hard disk is indicated as not being in connected. On the other hand, the second input terminal of the logic gate 24 is a low-level signal, and the logic gate 24 outputs a low-level signal, indicating that SAS hard disk or the SATA hard disk is not connected.

The second stage: the first signal becomes a high-level signal. Since the third input terminal of the logic gate 23 is a low-level signal, the first position signal at low-level is output with the logic gate 23, indicating that the NVME hard disk is not connected.

Figure 5:
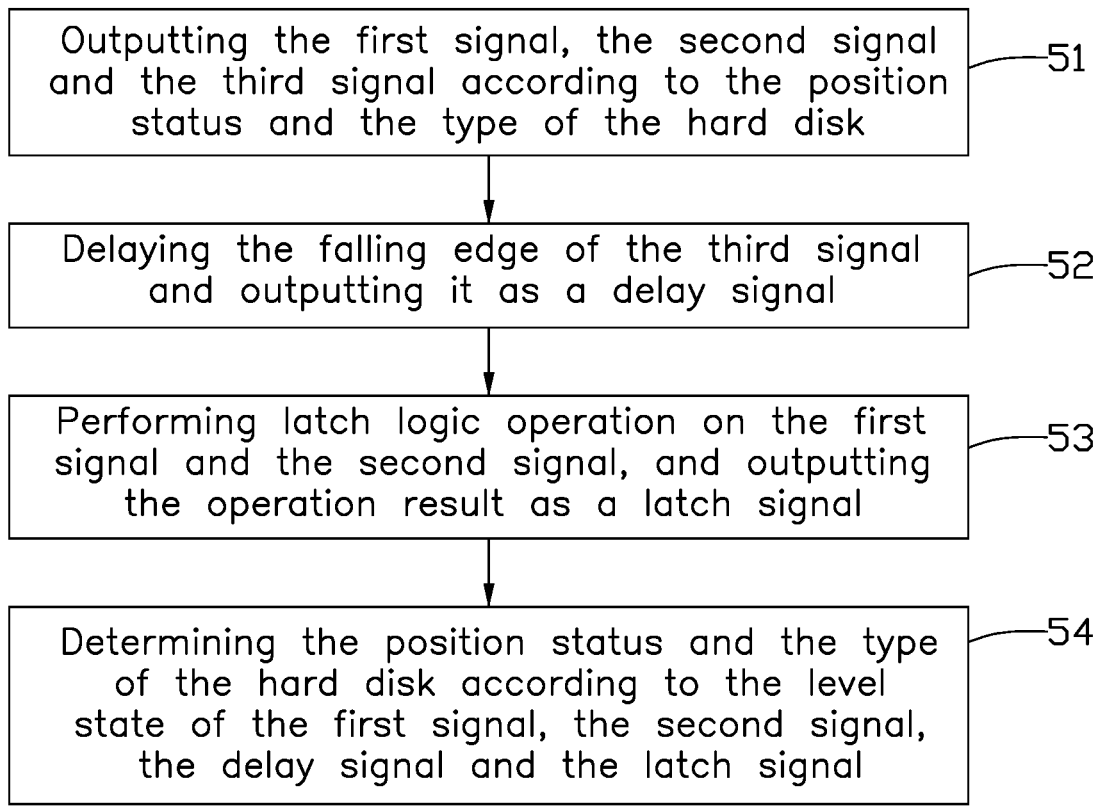
FIG. 5 is a flowchart of a hard disk detecting method according to an embodiment of the present disclosure.

FIG. 5 is a flowchart depicting an embodiment of a method for detecting connected or non-connected status of hard disk and the hard disk type, the method is provided by way of example, as there are a variety of ways to carry out the method.

Each block shown in FIG. 5 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 51.

At block 51, outputting the first signal, the second signal and the third signal according to the position status and the type of the hard disk.

In the embodiment, the position status indicates whether the hard disk 40 has been inserted into the connector 10, and the first signal, the second signal and the third signal are used to instruct the control circuit 20 to determine the position status and the type of the hard disk 40.

In one embodiment, the hard disk 40 can be a SAS hard disk, a SATA hard disk, or an NVME hard disk.

In the embodiment, before the hard disk 40 is inserted to the connector 10, the pins P4, P10, S7 and S14 are electrically connected to the DC power supply through a pull-up resistor (not shown), so the level states at the pins P4, P10, S7 and S14 are high-level, the first signal, the second signal, the third signal and the fourth signal are high-level signals.

When the SAS hard disk or the SATA hard disk is inserted, because the positions corresponding to the pins P4, P10, and S7 on the SAS hard disk or the SATA hard disk have a short path to ground, the level state at the pins P4, P10, and S7 is no longer determined by the DC power supply, but the low level in the grounded state, and the first signal, the second signal and the third signal are low-level signals.

The position corresponding to the pin S14 on the SAS hard disk has a short path of grounding, at this time, the fourth signal is a low-level signal, while the position corresponding to the pin S14 on the SATA hard disk does not have a short path of grounding, at this time, the fourth signal is a high-level signal.

When the NVME hard disk is inserted, because the positions corresponding to the pins P4, S7, and S14 on the NVME hard disk have a short path to ground, the level state at the pins P4, S7, and S14 is no longer determined by the DC power supply, but the low level in the grounded state, that is, the first signal, the third signal and the fourth signal are low-level signals, and the second signal is still high-level signals.

At block 52, delaying the falling edge of the third signal and outputting it as a delay signal.

At block 53, performing latch logic operation on the first signal and the second signal, and outputting the operation result as a latch signal.

The level state of the latch signal is shown in Table 1.

When both the first signal and the second signal are low-level signals, the latch signal is a low-level signal. When both the first signal and the second signal are high-level signals, the latch signal is a high-level signal. When the level states of the first signal and the second signal are different, the latch signal maintains the level state at the previous time. The first signal and the second signal can be latched by the latch circuit 28 to output the latch signal. When the SAS hard disk or the SATA hard disk is hot unplugged, the second signal is a high-level signal, and the first signal may still be a low-level signal. The latch signal maintains the level state at the time before the SAS hard disk or the SATA hard disk is hot unplugged, and the latch signal is the low-level signal.

At block 54, determining the position status and the type of the hard disk according to the level state of the first signal, the second signal, the delay signal and the latch signal.

In the embodiment, the position status detection method for NVME hard disk is shown in Table 2.

TABLE 2

| First signal | Second signal | Delay signal | Latch signal | First position signal |
|---|---|---|---|---|
| 0 | 1 | 0 | 1 | 1 |
| 1 | X | X | X | 0 |
| 0 | 0 | X | X | 0 |

TABLE 2-continued

| First signal | Second signal | Delay signal | Latch signal | First position signal |
|---|---|---|---|---|
| 0 | 1 | 1 | X | 0 |
| 0 | 1 | 0 | 0 | 0 |

As shown in Table 2, "0" represents low-level signal, "1" represents high-level signal, "X" represents low-level or high-level signal.

In the embodiment, only when the level states of the first signal, the second signal, the delay signal and the latch signal are low level, high level, low level and high level respectively, the control circuit 20 determines that the NVME hard disk is position status and outputs the NVME signal at high level.

For the SAS hard disk or the SATA hard disk, its position detection is carried out according to the first signal and the second signal. If both are high-level signals, no hard disk is in position. If both are low-level signals, the SAS hard disk or the SATA hard disk is in position.

In some embodiments, if the SAS hard disk or the SATA hard disk is in position and the fourth signal is a low-level signal, the SAS hard disk is in position, and if the SAS hard disk or the SATA hard disk is in position and the fourth signal is a high-level signal, the SATA hard disk is in position.

Figure 6A:
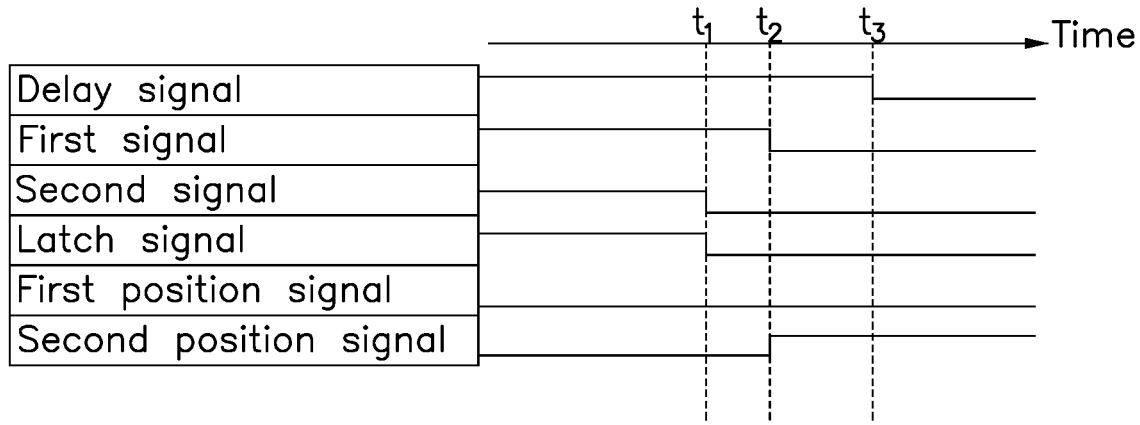
FIGS. 6A and 6B are schematic diagrams of results of the hard disk detecting method according to an embodiment of the present disclosure.

FIG. 6A is a schematic diagram of the detection results during hot insertion of the hard disk in position detection method provided by an embodiment of the present disclosure.

At time T1, the first signal changes from a high-level signal to a low-level signal. At this time, the SAS hard disk or the SATA hard disk is hot inserted, but because the level changes of the first signal and the second signal are not synchronized, the level state change of the first signal is earlier than that of the second signal. The second signal is still a high-level signal, and the delay signal is also a high-level signal. At this time, the control circuit 20 determines that the NVME hard disk is not in position, and the first position signal is a low-level signal.

Figure 6B:
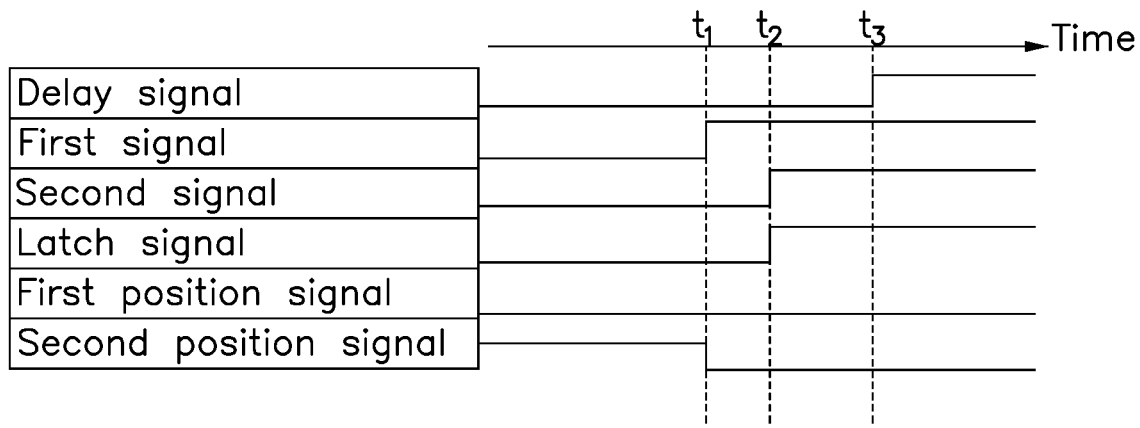

FIG. 6B is a schematic diagram of the detection results during hot insertion of the hard disk in position detection method is hot pulled out according to an embodiment of the present disclosure.

At time T4, the second signal changes from a low-level signal to a high-level signal. At this time, the SAS hard disk or the SATA hard disk is hot unplugged, but the level changes of the first signal and the second signal are not synchronized. At this time, the level state change of the second signal is earlier than that of the first signal. The first signal is still a low-level signal, and the delay signal is also a low-level signal. The latch signal holds the low-level signal at the time before. At this time, the control circuit 20 determines that the NVME hard disk is not in position, and the first position signal is a low-level signal.

Therefore, when the SAS hard disk or the SATA hard disk is hot swapped, the position status of the NVME hard disk is determined according to the level states of the first signal, the second signal, the delay signal and the latch signal, and the interference caused by the asynchronous level changes of the first signal and the second signal can be eliminated.

Those of ordinary skill in the art should realize that the above embodiments are only used to illustrate the present disclosure, but not to limit the present disclosure. As long as they are within the essential spirit of the present disclosure, the above embodiments are appropriately made. Changes and changes fall within the scope of protection of the present disclosure.

What is claimed is:

1. A hard disk detecting device comprising:
    a connector electrically coupled to the hard disk; and;
    a control circuit electrically coupled to the connector; wherein:
    when a first type of the hard disk is connected to the connector, the connector outputs a first signal at low-level, a second signal at the low-level and, a third signal at the low-level,
    when a second type of the hard disk is connected to the connector, the connector outputs the first signal at the low-level, the second signal at high-level, and the third signal at the low-level,
    when no hard disk is connected to the connector, the connector outputs the first signal at the high-level, the second signal at the high-level, and the third signal at the high-level,
    the first signal, the second signal and the third signal are used to represent position status and type of the hard disk,
    the control circuit comprises a delay circuit and a latch circuit, the delay circuit is used to delay a falling edge of the third signal and outputs a delay signal, and the latch circuit is used to perform latch logic operation on the first signal and the second signal, and outputs an operation result as a latch signal,
    the control circuit is used to determine the position status and the type of the hard disk according to the level states of the first signal, the second signal, the delay signal, and the latch signal, and
    the delay signal and the latch signal are used to correct error of the control circuit in determining the position status and the type of the hard disk due to asynchronous change of the first signal and the second signal.

2. The hard disk detecting device of claim 1, wherein if the level state of the first signal is the same as the level state of the second signal, the level state of the latch signal is the same as the level state of the first signal.

3. The hard disk detecting device of claim 1, wherein if the level state of the first signal is different from the level state of the second signal, the level state of the latch signal remains unchanged.

4. The hard disk detecting device of claim 1, wherein:
    the control circuit determines the first type of the hard disk according to the first signal at the low-level and the second signal at the low-level; and
    the control circuit determines the second type of the hard disk according to the first signal at the low-level, the second signal at the high-level, the delay signal at the low-level and the latch signal at the high-level.

5. The hard disk detecting device of claim 4, wherein if the control circuit determines the first type of the hard disk is in position status, the control circuit outputs a first position signal at the high-level.

6. The hard disk detecting device of claim 5, wherein if the control circuit determines the second type of the hard disk is in position status, the control circuit outputs a second position signal at the high-level.

7. The hard disk detecting device of claim 4, wherein:
    the connector is used to output a fourth signal;
    when a third type of the hard disk is connected to the connector, the connector outputs a fourth signal at the low level; and when a fourth type of the hard disk is connected to the connector, the connector outputs the fourth signal at the high-level.

8. The hard disk detecting device of claim 7, wherein the control circuit is used to determine the position status and the third type of the hard disk or the fourth type of the hard disk according to the level state of the first signal, the second signal, and the fourth signal.

9. A hard disk detecting method comprising:
    outputting from a connector a first signal at low-level, a second signal at the low-level and, a third signal at the low-level when a first type of the hard disk is connected to the connector;
    outputting from the connector the first signal at the low-level, the second signal at high-level, and the third signal at the low-level when a second type of the hard disk is connected to the connector;
    outputting from the connector the first signal at the high-level, the second signal at the high-level, and the third signal at the high-level when no hard disk is connected to the connector, wherein the first signal, the second signal and the third signal are used to represent position status and type of the hard disk;
    delaying by a control circuit a falling edge of the third signal and outputting a delay signal, and performing latch logic operation on the first signal and the second signal, and outputting an operation result as a latch signal; and
    determining by the control circuit the position status and the type of the hard disk according to level states of the first signal, the second signal, the delay signal, and the latch signal, wherein the delay signal and the latch signal are used to correct error of the control circuit in determining the position status and the type of the hard disk due to asynchronous change of the first signal and the second signal.

10. The hard disk detecting method of claim 9, wherein if the level state of the first signal is the same as the level state of the second signal, the level state of the latch signal is the same as the level state of the first signal.

11. The hard disk detecting method of claim 9, wherein if the level state of the first signal is different from the level state of the second signal, the level state of the latch signal remains unchanged.

12. The hard disk detecting method of claim 9, further comprising:
    determining the first type of the hard disk according to the first signal at the low-level and the second signal at the low-level; and
    determining the second type of the hard disk according to the first signal at the low-level, the second signal at the high-level, the delay signal at the low-level, and the latch signal at the high-level.

13. The hard disk detecting method of claim 12, further comprising:
    outputting a first position signal at the high-level if the control circuit determines the first type of the hard disk is in position status.

14. The hard disk detecting method of claim 13, further comprising:
    outputting a second position signal at the high-level if the control circuit determines the second type of the hard disk is in position status.

15. The hard disk detecting method of claim 14, wherein when a third type of the hard disk is connected to the connector, the connector outputs a fourth signal at the low level.

16. The hard disk detecting method of claim 15, wherein when a fourth type of the hard disk is connected to the connector, the connector outputs the fourth signal at the high-level.

17. The hard disk detecting method of claim 16, further comprising:
  determining the position status and the third type of the hard disk or the fourth type of the hard disk according to the level state of the first signal, the second signal, and the fourth signal.

* * * * *